United States Patent
Myer, Sr.

[15] 3,651,907
[45] Mar. 28, 1972

[54] OVERRUNNING CLUTCH FOR TRANSFER CASE TRANSMISSION

[72] Inventor: Albert F. Myers, Sr., Warren, Mich.
[73] Assignee: Boise Cascade Corporation, Boise, Idaho
[22] Filed: Aug. 3, 1970
[21] Appl. No.: 60,386

[52] U.S. Cl..............................192/43, 192/46, 192/48.91, 192/48.92, 192/67 A, 192/94, 192/108
[51] Int. Cl.................F16d 41/00, F16d 11/04, F16d 23/08
[58] Field of Search..................192/43, 46, 48.91, 48.92, 52, 192/53 F, 67 A, 94, 108

[56] References Cited

UNITED STATES PATENTS

| | | | |
|---|---|---|---|
| 1,254,180 | 1/1918 | Ward | 192/43 |
| 2,064,075 | 12/1936 | McPherson | 192/43 |
| 2,257,674 | 9/1941 | Dunn | 192/53 F |
| 2,797,783 | 7/1957 | Lee et al. | 192/43 |
| 3,200,919 | 8/1965 | Lanigan et al. | 192/43 X |

*Primary Examiner*—Allan D. Herrmann
*Attorney*—Lawrence E. Laubscher

[57] ABSTRACT

A reversible overrunning clutch adapted for use in a transfer case transmission, characterized by the provision of holdout ring means for maintaining the clutch in a disengaged condition as long as a driven shaft has a speed of rotation greater than that of a driving shaft. A central drive member is axially shiftable between two alternate clutch-engaged positions as a function of the direction of rotation of the driving shaft. The holdout ring means include a pair of colinearly arranged rings rotatably mounted on opposite sides of the central drive member, respectively, said rings having lug portions that extend axially between radial projections on the inner periphery of the central drive member. Stepped portions on the lugs define lands that are adapted to engage the radial projections to retain the drive member in the disengaged condition.

12 Claims, 14 Drawing Figures

INVENTOR.
Albert F. Myers, Sr.
BY
Lawrence E. Laubscher
ATTORNEY

INVENTOR.
Albert F. Myers, Sr.

PATENTED MAR 28 1972　　　　　　　　3,651,907

INVENTOR.
Albert F. Myers, Sr.

BY

Lawrence E. Laubscher
ATTORNEY

INVENTOR.
Albert F. Myers, Sr.
BY
Lawrence E. Laubscher
ATTORNEY

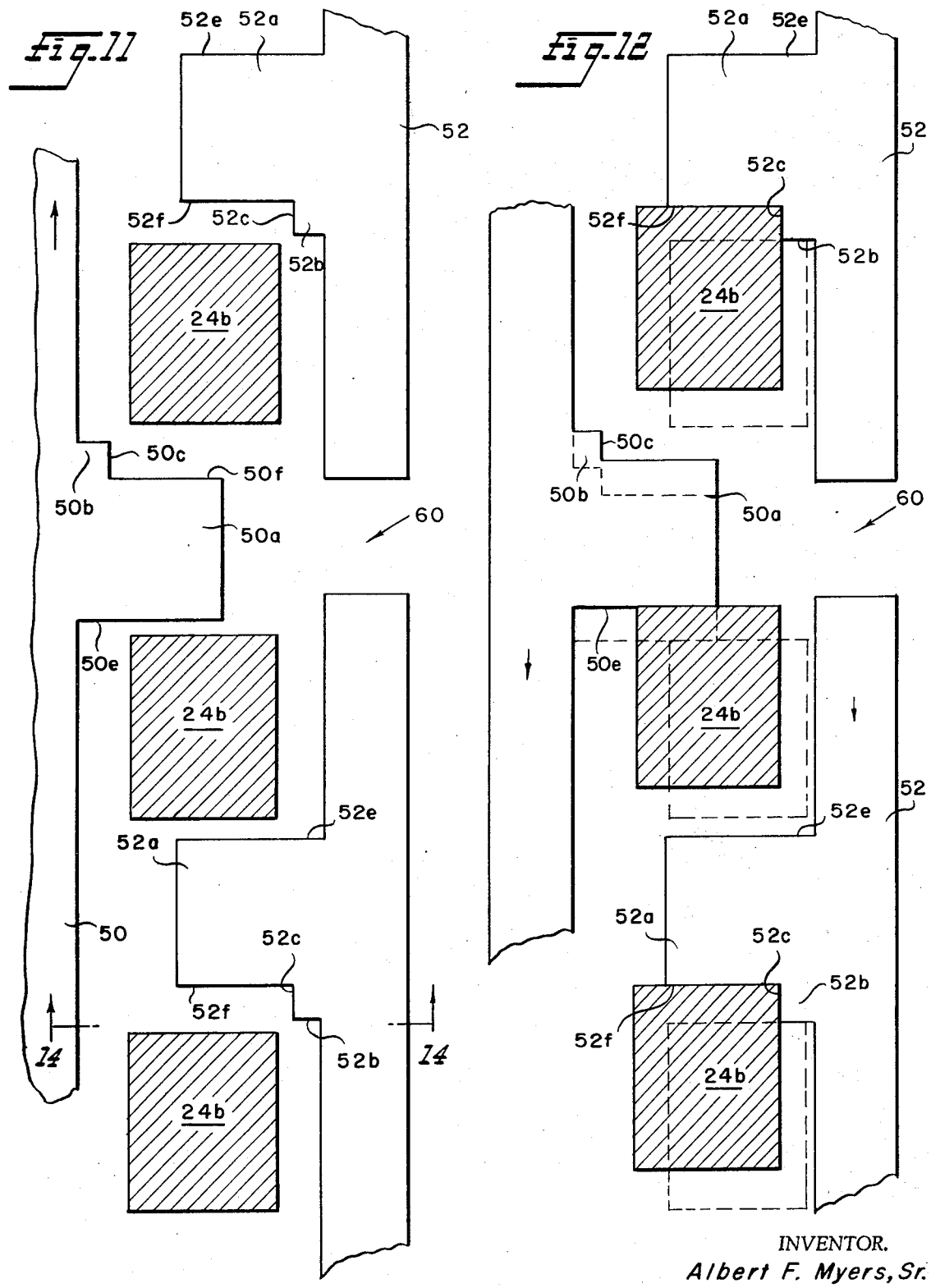

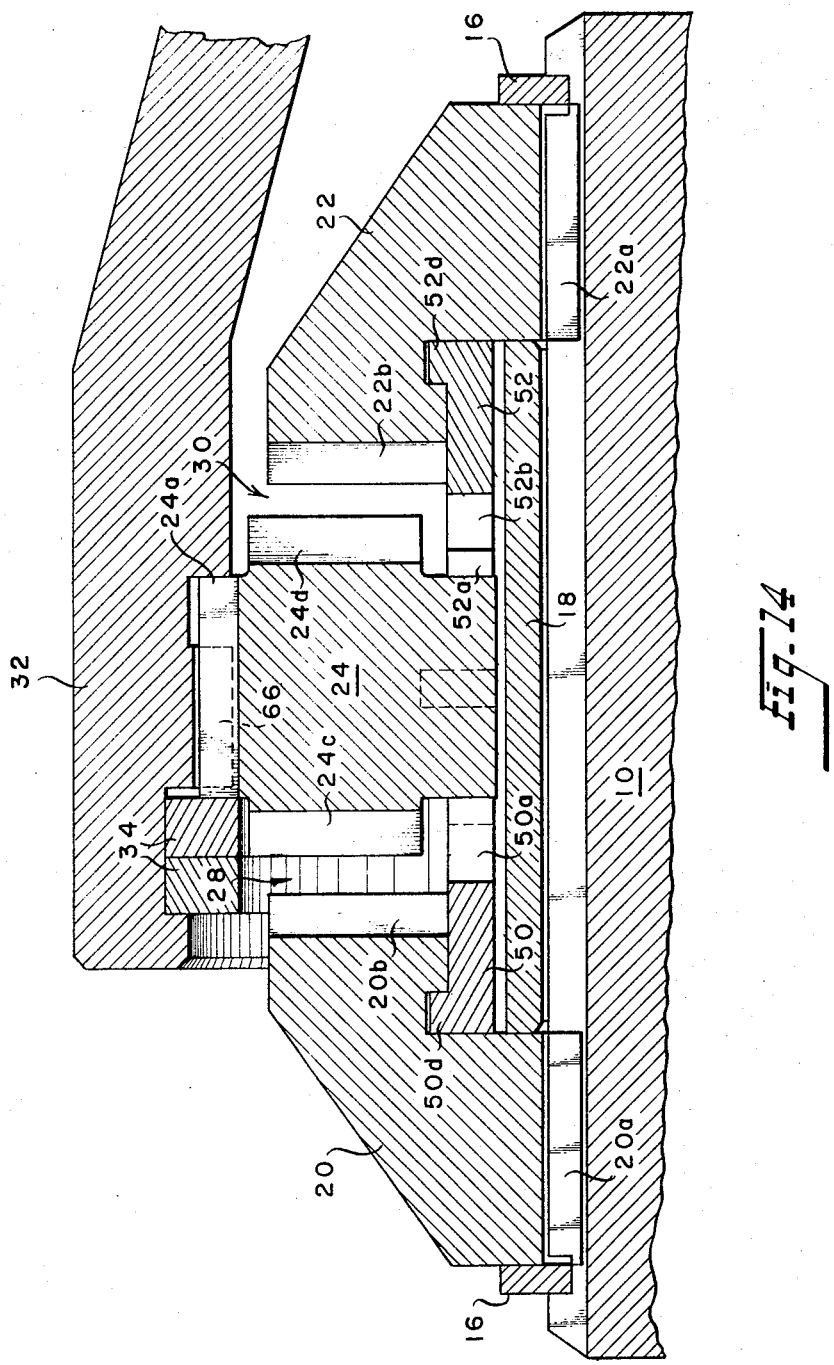

OVERRUNNING CLUTCH FOR TRANSFER CASE TRANSMISSION

Reversible overrunning clutches are well known in the patented prior art, as evidenced by the patents to Beall U.S. Pat. No. 2,364,019, Lee et al. U.S. Pat. No. 2,797,783, and Lanigan et al. U.S. Pat. No. 3,200,919. Furthermore, the use of screw thread means for effecting operation of reversible clutch means is disclosed in the art, as evidenced by the patents to Ward U.S. Pat. No. 1,254,180, Rienirth U.S. Pat. No. 1,886,226, and Conrad U.S. Pat. No. 1,934,039, among others.

In the transfer case or "drop box" type of differential mechanisms, it is conventional provide holdout cam means for maintaining the differential in a disengaged condition when driving and driven shafts have a given relative rotational velocity, as evidenced by my prior U.S. Pat. Nos. 2,329,075, 2,667,087, 2,667,088, 2,830,466 and 3,451,496.

The primary object of the present invention is to provide improved reversible overrunning clutch means including direction-responsive means for alternately displacing a central drive member axially between two clutch engaging positions as a function of the direction of rotation of the driving shaft, in combination with holdout ring means for maintaining the central drive member in a disengaged condition as long as the driven shaft has a higher rotational velocity than the driving shaft. The clutch means includes two alternately engageable sets of driving and driven overrunning clutch teeth for driving the driven shaft in a direction corresponding with the direction of rotation of the driving shaft.

A more specific object of the invention is to provide a transfer case transmission of the type described above, wherein the holdout rings are mounted for rotation concentrically about, but are restrained against axial displacement relative to, the driven shaft, said rings being arranged on opposite sides of the central drive member and including axial lugs that extend within the spaces between radial projections on the axially shiftable central drive member. In the illustrated embodiment, the radial projections are on the inner periphery of the annular central drive member, said lugs including stepped portions that define lands for engaging the radial projections to maintain the central drive member in a disengaged position. The holdout rings are preferably formed of spring metal and are split axially to define gaps, said rings normally being radially expansible into frictional rotary engagement with the stationary clutch collar members, respectively, between which the central drive member is axially shifted.

A further object of the present invention is to provide a transfer case differential of the above type, wherein a central drive retainer member is axially shiftable as a function of the direction of rotation of the driving shaft to effect alternate engagement of the appropriate set of overrunning clutch teeth. The retainer member is connected at one end with the central drive member, and spline teeth means having a lead angle of approximately 30° connect the other end of the retainer with the driving shaft. Consequently, when the central drive member is released (for example, by the momentary loss of traction of the axle associated with the driving shaft) from the locked-out intermediate disengaged condition, the central drive member is axially shifted in the proper direction by the cooperation between the spline teeth on the driving shaft and on the central drive retainer member, respectively. Friction brake means are provided for resisting rotation of the central drive retainer member relative to the housing within which the adjacent ends of the driving and driven shafts are journaled, or relative to another appropriate differential speed member.

The overrunning reversible clutch means is particularly designed for use with a vehicle in which one shaft rotates faster than another (for example, in a transfer case differential for a 4×4 vehicle in which the front drive axle system normally rotates faster than the driving shaft by the use of smaller front tires or a higher numerical front axle ratio).

Other objects and advantages of the invention will become apparent from a study of the following specification when viewed in the light of the accompanying drawing, in which:

FIG. 11 is a diagrammatic representation illustrating the relationship between the holdout ring lugs and the radial projections on the central drive member when the central drive member is in an initial clutch-disengaged position;

FIG. 12 illustrates the relationship between the holdout rings and the central drive member when the central drive member is maintained in the locked-out clutch-disengaged position for one direction of rotation of the driving shaft;

FIG. 14 is a detailed view of the reversible clutch and holding ring means taken along line 14—14 of FIG. 11.

Figure 1:
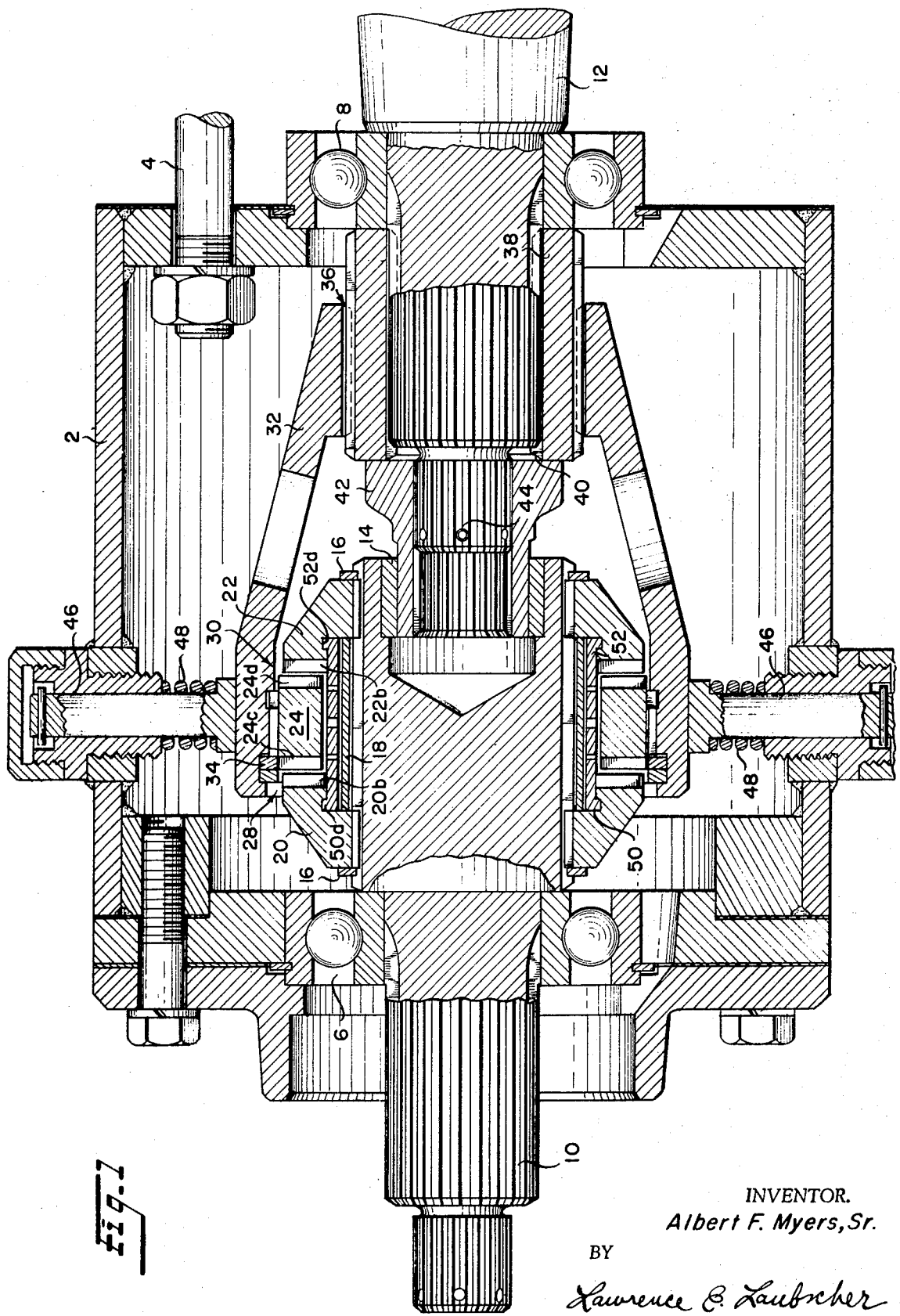
FIG. 1 is an axial sectional view of the improved reversible overrunning clutch means of the present invention.
Figure 2:
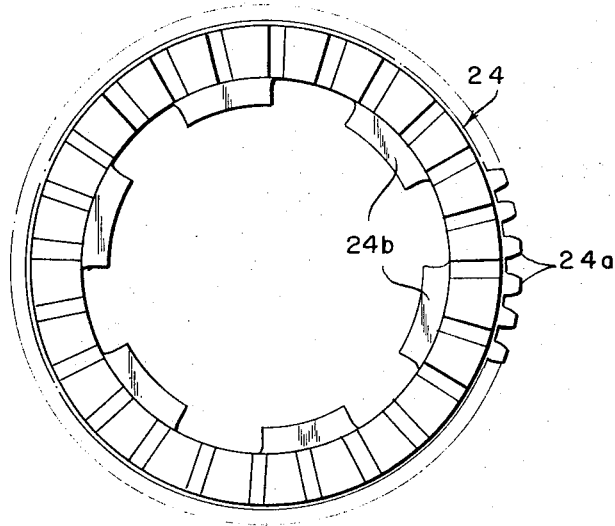
FIGS. 2 and 3 are end and partially broken away side elevation views, respectively, of the central drive member.
Figure 3:
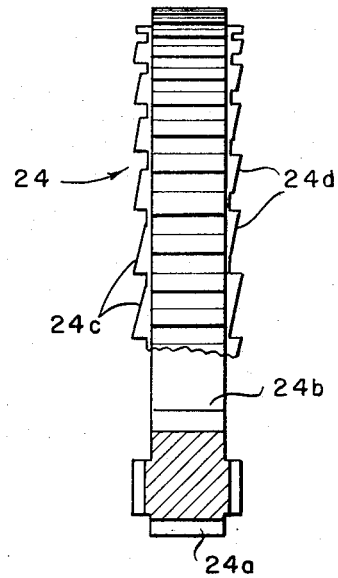
Figure 5:
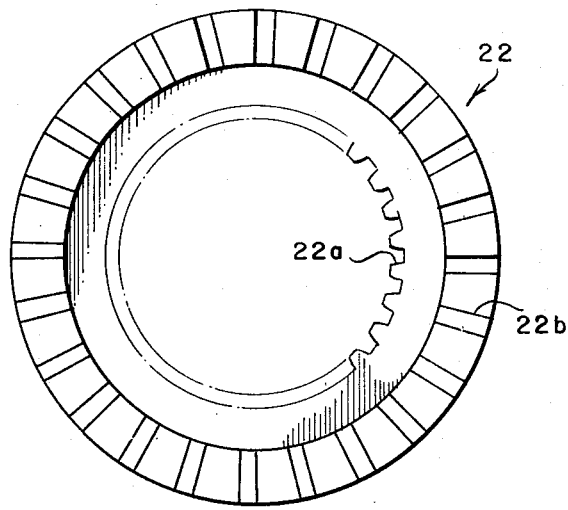
FIGS. 5 and 6 are end and axial section views, respectively, of one of the driven collar members.
Figure 6:
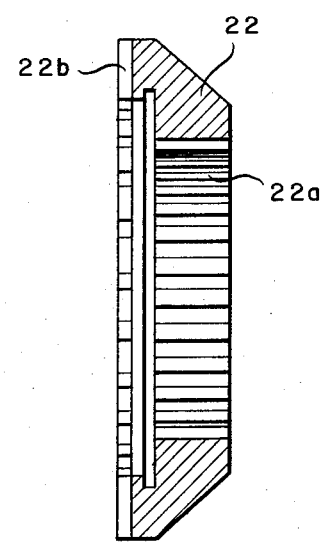
Figure 7:
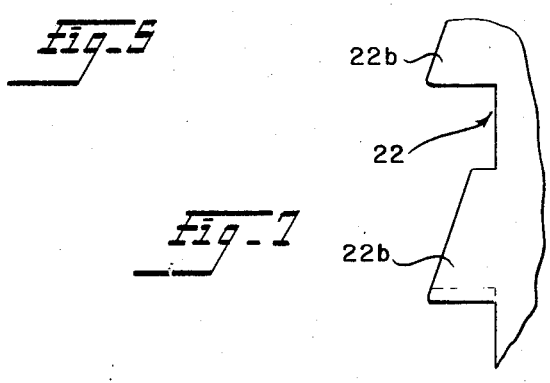
FIG. 7 is a detailed view of the overrunning driven clutch teeth on each driven collar member.

Referring first more particularly to FIG. 1, the reversible overrunning clutch includes a housing 2 adapted to be secured to the vehicle transmission case (not shown) by bolts 4, said housing including at each end fixed bearing means 6 and 8 in which are journaled the adjacent ends of colinearly arranged driven and driving shafts 10 and 12, respectively. The adjacent ends of the shafts 10 and 12 are further rotatably connected by the bearing sleeve 14. Splined upon driven shaft 10 and rigidly maintained by snap rings 16 in engagement with opposite ends of the concentrically mounted spacer sleeve 18 are a pair of driven collar members 20 and 22, respectively.

Arranged for rotation about the spacer sleeve 18 is an annular central drive member 24 that is axially shiftable between the collar members 20 and 22. At their adjacent end surfaces, the central drive and collar members are provided with alternately engageable sets of overrunning clutch teeth 28 and 30, the clutch teeth of one set being inclined oppositely to the teeth of the other set. In accordance with the present invention, means responsive to the direction of rotation of the drive shaft are provided for axially shifting the central drive member 24 in a direction effecting engagement of the appropriate one of the sets of clutch teeth 28 and 30. More particularly, a hollow generally cylindrical drive retainer member 32 is provided that is splined at one end to the outer periphery of the central drive member 24 and is retained against axial displacement relative thereto by the snap ring means 34. At the other end, the central drive retainer 32 is connected by mating spline teeth 36 with a drive sleeve 38 that is secured to drive shaft 12 by spline teeth 40, said drive sleeve being maintained against axial displacement by the engagement at one end with the bearings means 8 and at the other end with the pinion nut 42 that is threadably mounted on the drive shaft 12 and secured against rotation relative thereto by the cotter pin 44. As is shown in FIG. 1, the tubular end portion of the nut 42 defines the inner race of the bearing 14. As will be described below, the cooperating spline teeth 36 on the outer and inner peripheries of the drive sleeve 38 and the retainer member 32, respectively, have a lead angle of about 30 degrees, whereby the central drive member 24 is shifted axially in a direction corresponding with the direction of rotation of the driving shaft.

In order to brake the rotation of the central retainer member relative to the housing 2, radially arranged brake members 46 are connected for reciprocation relative to the housing, said brake members being biased by springs 48 into frictional engagement with the outer periphery of the central retainer.

In accordance with a characterizing feature of the present invention, holdout ring means are provided that are operable upon overrun of the driven shaft to lock the central drive member 24 in the illustrated disengaged position relative to a given one of the drive collars in accordance with the rotational sense of the driving shaft. More particularly, the holdout ring means comprise a pair of colinearly arranged holdout rings 50, 52 that are arranged concentrically about the spacer sleeve 18, said rings being rotatably connected with, but prevented from axial displacement relative to, said driven collar members 20 and 22, respectively. To this end, the rings include annular external flange portions 50d, 52d that extend within corresponding annular grooves contained in the collars 20 and 22, respectively. The holdout rings further include axially inwardly extending lug portions 50a, 52a (FIG. 14) adapted to engage radial inwardly extending projections on the central drive member, whereby in accordance with the directional sense of the driving shaft upon overrun of the driven shaft, one of the holdout rings will be rotated to a position to maintain the central drive member in the disengaged position.

Referring now to FIGS. 2-4 and 14, the annular central drive member 24 is provided on its outer periphery with external spline teeth 24a by means of which the member is rigidly connected with one end of the retainer member 32 by snap rings 34. On its inner periphery, the drive member includes a plurality of radially inwardly extending projections 24b that terminate adjacent the outer periphery of the spacer sleeve 18, as shown in FIG. 14. At opposite ends, the central drive member includes driving clutch teeth 24c and 24d, respectively, said teeth being of opposite drive angles and having the conventional overrunning tooth profile illustrated in FIG. 4. In the illustrated embodiment, six equally spaced radial projections are provided on the inner periphery of the central drive member.

Referring now to FIGS. 5-7 and 14, the driven clutch collars 20 and 22 are provided on their inner peripheries with spline teeth 20a, 22a by means of which the collars are splined to driven shaft 10. On their adjacent end faces, the collars are provided with driven overrunning clutch teeth 20b and 22b adapted to engagement with the corresponding driving clutch teeth 24c and 24d, respectively, on the central drive member. The profiles of the driving and driven clutch teeth are of conventional overrunning configuration, as will be seen from a comparison of FIGS. 4 and 7.

Figure 13:
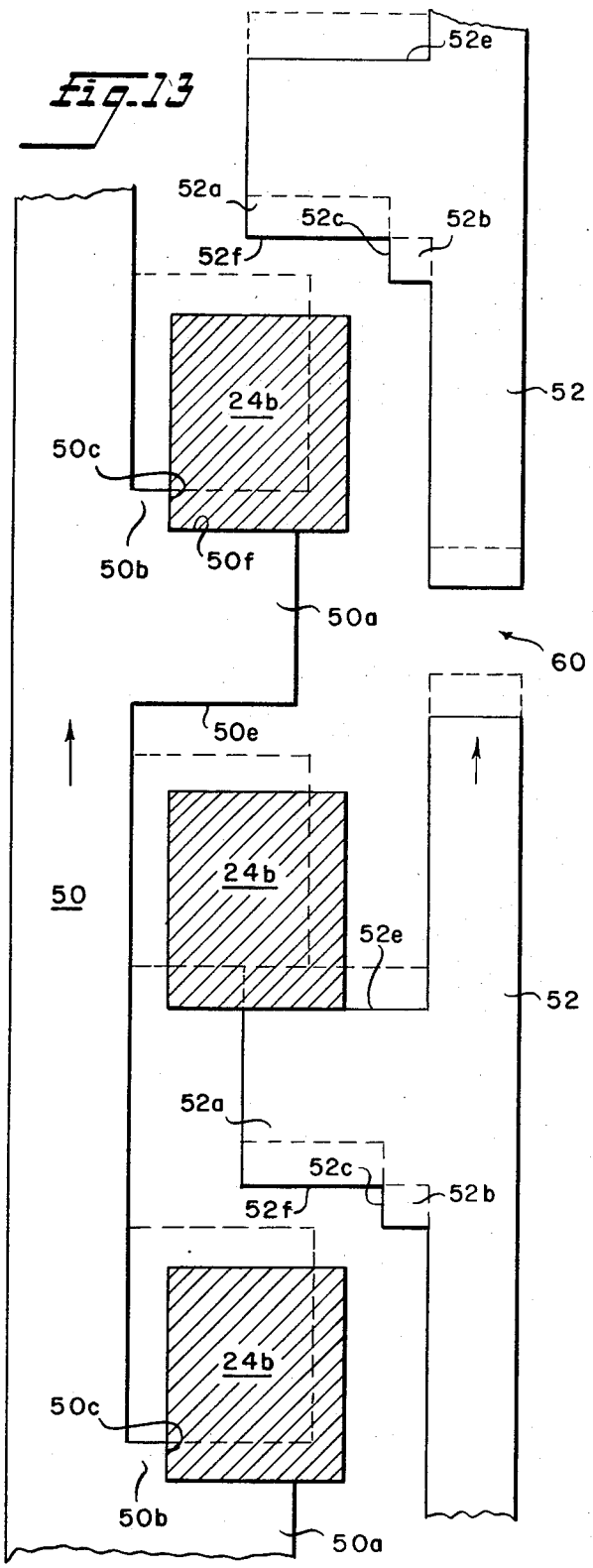
FIG. 13 illustrates the relationship of the holdout rings and central drive member for the opposite direction of rotation of the driving shaft.
Figure 4:
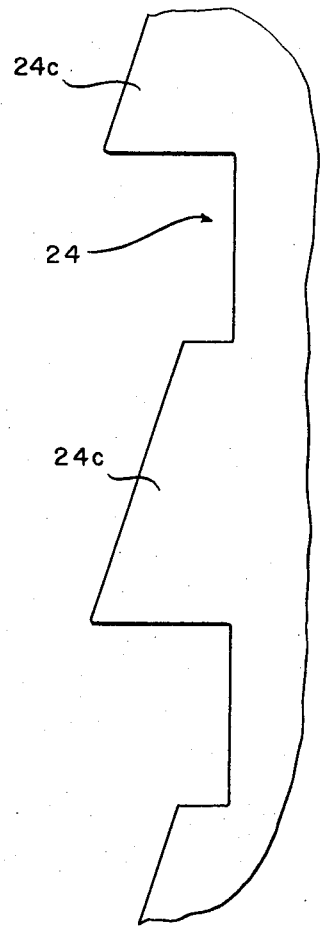
FIG. 4 is a detailed view of the overrunning driving clutch teeth on the central drive member.
Figures 8, 9:
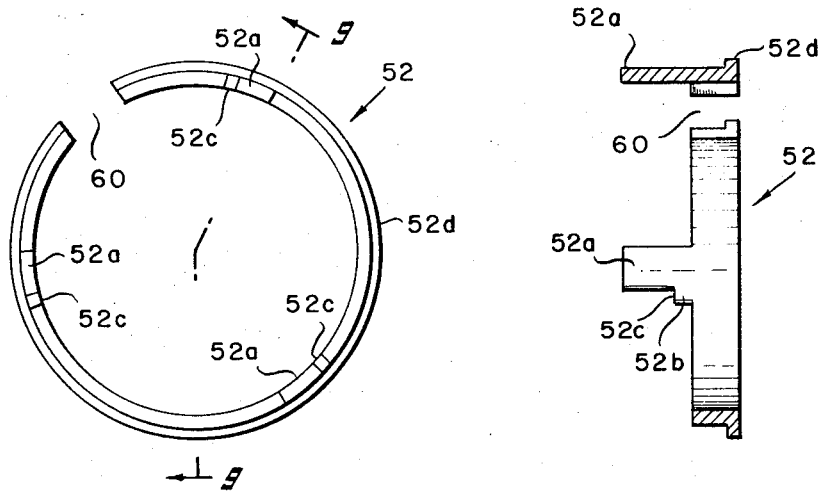
FIG. 8 is an end view of one of the holdout rings.
FIG. 9 is a sectional view taken along line 9—9 of FIG. 8.

Each of the holdout rings 50, 52 is axially split to define a gap 60 (FIGS. 8 and 9), said rings being formed of spring metal biased radially outwardly toward an expanded condition. Each ring includes three integral axially extending lugs 50a, 52a that extend between alternate pairs of the radial projections 24b on the central drive member 24, said lugs having stepped portions 50b, 52b that define land surfaces 50c, 52c, respectively, as shown in FIGS. 11-13. As illustrated in FIG. 14, the external integral flange portions 50d, 52d on the remote ends of the holdout rings extend within corresponding grooves in the recessed portions of the drive collars to prevent axial displacement of the holdout rings. The spring metal holdout rings are expanded radially outwardly into frictional contact with the peripheral walls of the recesses contained in the collar members. Thus the rings are free to rotate relative to the collars 20 and 22, but are prevented from axial displacement relative thereto.

Figure 10:
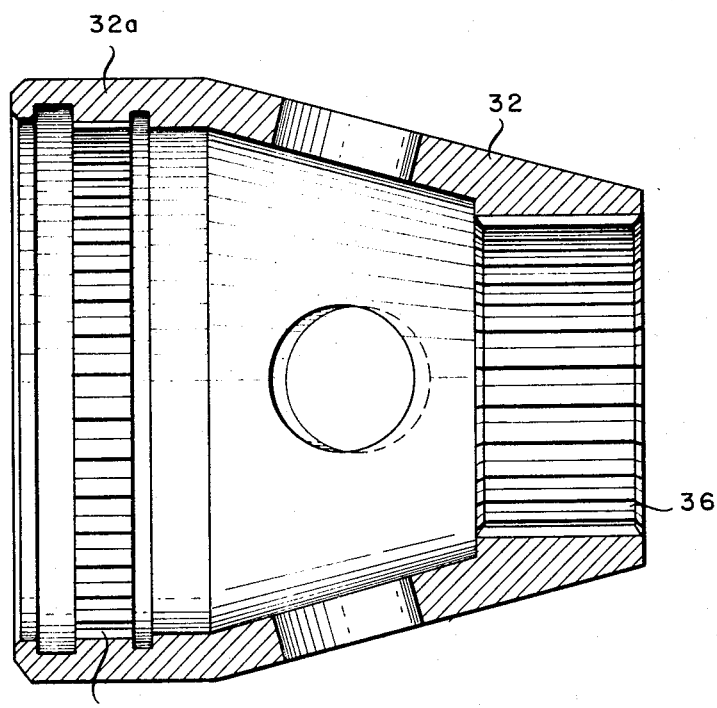
FIG. 10 is an axial sectional view of the central drive member.

Referring now to FIG. 10, the retainer member 32 is generally cylindrical and contains a first set of internal spline teeth 66 for connection with the external teeth on the central driver 24, and a second set of internal spline teeth 36 for connection with corresponding external spline teeth on the drive sleeve 38. The cylindrical external surface 32a of the left-hand end of the retainer member is preferably smooth and adapted for uniform frictional engagement by the spring-biased brake members 46.

OPERATION

The operation of the reversible overrunning clutch means will now be described with reference to the diagrammatic representations of FIGS. 11-13. It will be assumed that the driven shaft 10 is connected with a vehicle axle (such as the front axle of a 4×4 vehicle) that normally overruns another axle connected with the driving shaft 12 (as might occur, for example, when the front wheels have a smaller diameter than the rear wheels, or where the vehicle has a higher front axle ratio). Assume further that the central drive member is in the initial disengaged condition of FIG. 1, and that the holdout rings 50 and 52 initially have the relative angular positions illustrated in FIG. 11.

Upon rotation of the driving shaft in the direction illustrated by the arrows in FIG. 12, the leading lug surfaces 50e and 52f of the holdout rings 50 and 52 engage the adjacent surfaces of alternate ones of the radial projections 24b of the disengaged central drive member 24, whereupon the rings are rotated relative to their respective collars to the illustrated positions. Owing to the 30° lead angle between the spline teeth 36 relative to the direction of rotation of the driving shaft, the central drive member is shifted to the right toward the illustrated position in seated engagement with the land surfaces 52c of holdout ring 52. In this intermediate seated position, the clutch teeth on the central driving member are maintained disengaged from the clutch teeth on the corresponding collar.

In the event that the rotational speed of the driving shaft equals or exceeds that of the driven shaft 10 (as might occur when the rear wheels of the vehicle lose traction), the slight thrust force applied to the central drive member 24 causes it to be slightly rotated to a position free from the lands 52c, whereupon owing to the influence of the drive retainer thrust force, the central drive member 24 is further shifted to the right to the clutch engaged position illustrated in phantom. The right hand clutch drive teeth 24d of the central drive member are now in engagement with the clutch teeth 22b of the driven collar 22, whereupon the driven shaft 10 is directly driven by the driving shaft 12. When the front axle again increases speed to its normal overrunning condition, the throwout configuration of the clutch teeth causes the central drive member to be shifted to the left, whereupon the central drive member is relocked in the disengaged position by the holdout rings and the thrust force of the central drive member.

Assume now that the direction of rotation of the driving and driven shafts is reversed. As long as the driven shaft overruns the driving shaft, the holdout rings 50 and 52 and the thrust force of the drive retainer maintain the central drive member in the disengaged condition illustrated in FIG. 13. Owing to the cooperation between the spline teeth 36, the central drive member is shifted to the left, the left hand end surfaces of projections 24b being seated on the land surfaces 50c on the holdout ring 50. In the event that the rear wheels should lose traction and the speed of the driving shaft should equal or exceed that of the driven shaft, the slight thrust force applied to the central drive member 24 causes it to be slightly rotated to a position free from the lands 50c, whereupon the central drive member is further shifted to the left by the spline teeth 36 to the clutch engaged position shown in phantom. When the front axle again increases speed to its normal overrunning condition, the throwout configuration of the overrunning clutch teeth causes the central drive member to be shifted to the right toward the disengaged position shown in solid lines in FIG. 13.

While the preferred embodiment has been illustrated and described, it will be apparent to those skilled in the art that various changes and modifications may be made in the apparatus described. Thus, while the number of radial projections on the central drive member is preferably twice the number of the axial lugs on each holdout ring, it is apparent that the number and spacing of the projections and lugs may be varied, as desired, for certain operating conditions. Other modifications may be made in the apparatus disclosed without deviating from the inventive concept.

What is claimed is:

1. Reversible overrunning clutch means for a transfer case differential, comprising housing means, colinearly arranged driving and driven shafts rotatably connected with said housing means, respectively, the adjacent ends of said shafts being contained within said housing means; reversible overrunning clutch means for connecting said driving shaft with said driven shaft, including a pair of colinear driven collar members secured concentrically in longitudinally spaced relation to said driven shaft, respectively, and an annular central drive member mounted concentrically for axial displacement on said driven shaft between, coaxial with and spaced from said driven collar members, respectively, the adjacent end faces of said central drive and said collar members having corresponding alternately engageable sets of driving and driven overrunning clutch teeth for driving said driven shaft in opposite directions, respectively;

means responsive to the direction of rotation of said driving shaft for displacing said central drive member axially in a corresponding direction toward a clutch engaging position relative to a given one of said driven collars, respectively; and holdout ring means operable when the speed of rotation of said driven shaft is greater than that of said driving shaft for maintaining said central drive member in an intermediate disengaged position relative to said collar members, respectively.

2. Apparatus as defined in claim 1, wherein said means for axially displacing said central drive member comprises a generally cylindrical hollow retainer body arranged within said housing means concentrically about the adjacent ends of said driving and drive shafts, respectively, said retainer body being connected at one end with said central drive member;

and drive means connecting the other end of said retainer body for rotation with said driving shaft, said drive means being operable to axially displace said retainer body in a direction dependent on the direction of rotation of said driving and driven shafts.

3. Apparatus as defined in claim 2, wherein said drive means comprises intermeshing driving and driven spline teeth carried by the outer and inner peripheries of said driving shaft and said retainer body, respectively.

4. Apparatus as defined in claim 3, wherein said spline teeth have a lead angle of approximately 30 degrees.

5. Apparatus as defined in claim 3, and further including friction brake means for frictionally resisting the rotational movement of said cylindrical retainer body relative to said housing means.

6. Apparatus as defined in claim 5, wherein said friction brake means includes at least one brake pin connected with said housing for axial movement radially of said retainer body, and spring means biasing said brake pin toward frictional engagement with the outer periphery of said retainer body.

7. Apparatus as defined in claim 2, wherein said central drive member includes a plurality of circumferentially spaced radial projections;

and further wherein said holdout ring means comprises a pair of colinearly arranged holdout rings mounted concentrically about said driven shaft between said driven collar members, respectively, said rings being connected at their remote ends for rotary movement relative to, but prevented against displacement axially of, said driven collar members, respectively, said holdout rings including at their adjacent ends a plurality of axially extending lug portions that extend within the spaces defined between the radial projections on said central drive member, respectively.

8. Apparatus as defined in claim 7, wherein said central drive member is spaced concentrically from, and said projections extend inwardly radially toward, said driven shaft;

and further including a spacer sleeve arranged concentrically intermediate said driven shaft and said holdout rings, said spacer sleeve being in abutting engagement at each end with said driven collar members, respectively.

9. Apparatus as defined in claim 8, wherein the adjacent faces of said driven collar members are counterbored to define annular recesses for receiving the corresponding ends of said spacer sleeve and said holdout rings, respectively, each of said holdout rings being axially split and formed of a resilient material, said rings being biased radially outwardly toward an expanded condition in frictional engagement with the corresponding cylindrical wall portion of the associated recesses, respectively.

10. Apparatus as defined in claim 9, and further wherein each of said rings includes on its outer periphery an external annular flange portion that extends within a corresponding groove contained in the wall of the corresponding counterbored recess, respectively, whereby said holdout rings are locked against axial displacement relative to said drive collars, respectively.

11. Apparatus as defined in claim 7, wherein at least one of the axially extending lug portions of each of said holdout rings includes a step portion on the leading edge thereof relative to the corresponding radial projection of said central drive member when the speed of rotation of said driven shaft exceeds that of said driving shaft, said step portion having a land surface adapted to engage said radial projection to prevent axial displacement of said central drive member toward the corresponding clutch engaged position.

12. Apparatus as defined in claim 11, wherein the end surfaces of said radial projections and the corresponding land surfaces are planar and are contained in parallel planes normal to the colinear axis of said shafts.

* * * * *